United States Patent [19]

Uehara et al.

[11] Patent Number: 5,372,325
[45] Date of Patent: Dec. 13, 1994

[54] THUMBING RING FOR FISHING REEL SPOOLS

[75] Inventors: Masayuki Uehara; Masagi Saito; Takeo Miyazaki, all of Tokyo, Japan

[73] Assignee: Daiwa Seiko, Inc., Tokyo, Japan

[21] Appl. No.: 996,066

[22] Filed: Dec. 23, 1992

[30] Foreign Application Priority Data

Jan. 17, 1992 [JP] Japan ............................ 4-005482[U]

[51] Int. Cl.⁵ .......................................... A01K 89/033
[52] U.S. Cl. .................................... 242/322; 242/292
[58] Field of Search ............... 242/322, 319, 317, 310, 242/292, 294

[56] References Cited

U.S. PATENT DOCUMENTS

| | | | |
|---|---|---|---|
| 1,507,638 | 9/1924 | Verhey | 242/292 |
| 1,855,738 | 4/1932 | Case | 242/322 |
| 3,765,618 | 10/1973 | Johnson et al. | 242/319 X |
| 4,061,288 | 12/1977 | Karlsson et al. | 242/319 |
| 4,162,049 | 7/1979 | Stutz, Jr. | 242/292 |
| 4,733,830 | 3/1988 | Hollander | 242/292 |
| 4,750,687 | 6/1988 | Sievert et al. | 242/317 X |
| 4,883,238 | 11/1989 | Harder | 242/317 |
| 5,064,139 | 11/1991 | Toda | 242/317 X |
| 5,120,003 | 6/1992 | Sacconi | 242/322 X |

FOREIGN PATENT DOCUMENTS 63-254937 10/1988 Japan .

*Primary Examiner*—Daniel P. Stodola
*Assistant Examiner*—Michael R. Mansen
*Attorney, Agent, or Firm*—Longacre & White

[57] ABSTRACT

A spool (3) is rotatably fitted to a support shaft (2) of a reel main body (1). The spool (3) is formed of aluminum in a cylindrical shape by die casting and includes a winding drum portion (3a), around which a fishing line (not show) is to be wound, and two flanges (3b and 3c) respectively provided on either side thereof. On the outside of the flange portion (3b) of the spool (3) disposed on the opening side of the reel main body (1), there is formed a notch portion (3d) to the outside of which a separate ring (4) is mounted and fixed by adhesives. The ring (4) is formed in a porous pan shape by machining an aluminum member. And, the ring (4) includes an inner peripheral surface (4a) which is to be placed on the outer periphery of the flange (3b) of the spool (3), and an outer peripheral surface (4b) which is formed so as to be substantially level with the outer periphery (1a) of the reel main body (1). Also, the ring (4) is exposed out to the outer periphery of the reel main body (1) disposed on the opening side thereof. The outer peripheral surface (4b) of the ring (4) is formed in a smooth surface by machining an aluminum member and it may be formed so as to have a shape ideal for an excellent thumbing operation and may be given color and luster.

11 Claims, 5 Drawing Sheets

THUMBING RING FOR FISHING REEL SPOOLS

BACKGROUND OF THE INVENTION

The present invention relates to a fishing reel which is improved in the shape, material and the like of the outer periphery of a flange portion of a spool.

Conventionally, there is known a fishing reel which includes a spool rotatable by means of a handle operation and also in which the outer periphery of a flange of the spool is exposed out of a reel main body; for example, there is known a fishing reel of a single bearing type which is disclosed in Patent Japanese Publication No. 63-254927 of Showa.

However, in the conventional fishing reel, due to the fact that the outer periphery of the flange of the spool exposed out of the reel main body is formed integrally with the spool main body, the shape and material thereof are limited in manufacturing. For example, when the spool flange outer periphery is manufactured by die casting, then it lacks minuteness and uniformity. This makes it impossible to provide such shape and material that can offer an excellent thumbing action required of the fishing reel of this type. Also, this makes it difficult to color and luster the spool flange outer periphery. Further, when the reel strikes other things or is dropped down, then the flange outer periphery is easily broken or damaged, which means that it lacks practicality.

Therefore, the present invention aims at eliminating the problems found in the above-mentioned conventional fishing reels that the spool flange outer periphery exposed out of the reel main body puts a limit on the shape and material in manufacturing, that is, it makes it impossible to provide such shape and material that can offer an excellent thumbing action and also that the flange outer periphery lacks practicality from the viewpoint of protection against breakage or damage.

SUMMARY OF THE INVENTION

Accordingly, it is an object of the invention to provide a fishing reel which is capable of selecting and setting the optimum shape and material as well as the optimum color and luster for the spool flange outer periphery thereof, providing an excellent thumbing action, and improving the practicality thereof from the viewpoint of protection.

In attaining the above object, according to the invention, there is provided a fishing reel in which a spool to be rotatable by rotating a handle is supported by a reel main body and a fishing line is wound around the spool, characterized in that a separate ring is fitted and fixed to the flange outer periphery of the spool to thereby expose it out of the reel main body in such a manner that the outer periphery of the ring can be thumbed.

When a fishing reel of a single bearing type is used, a fishing rod is held by one hand and a handle knob is grasped by the other hand, so that the spool is rotated to wind the fishing line around the line winding drum portion of the spool.

When a lure (not shown) is thrown and the fishing line is delivered out from the spool, the thumb of the hand holding the fishing rod is not put on the outer peripheral surface of a ring to perform a thumbing operation.

DETAILED DESCRIPTION OF THE INVENTION

Description will be hereinbelow given of the invention by way of the illustrated embodiments thereof with reference to the accompanying drawings.

Figure 1:
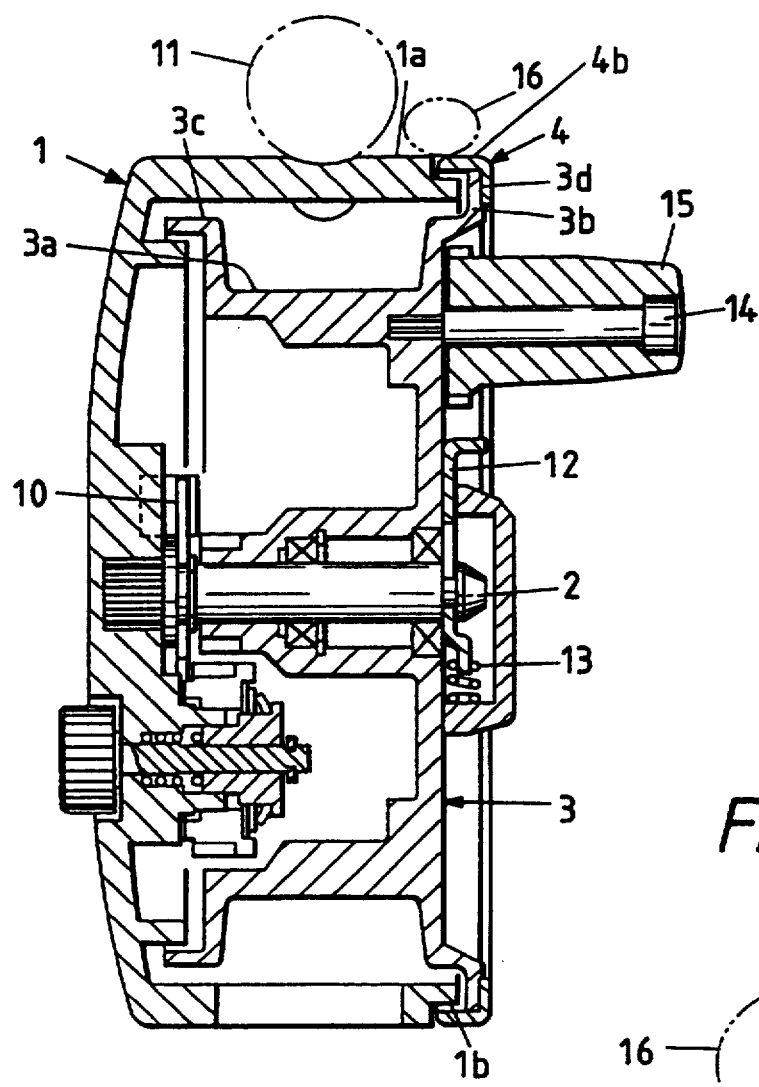
FIG. 1 is a sectional view of a first embodiment of a fishing reel of a single bearing type according to the invention.
Figure 2:
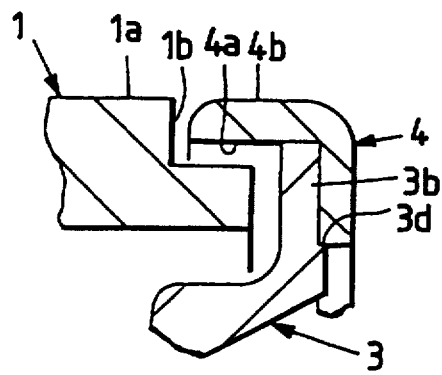
FIG. 2 is an enlarged sectional view of main portions of the above fishing reel.
Figure 3:
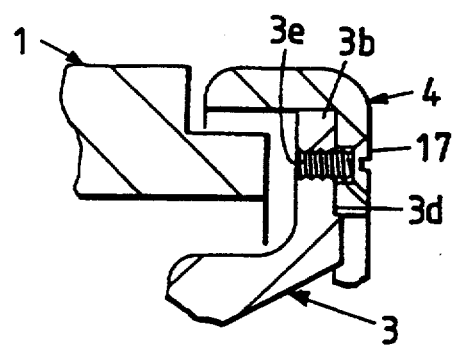
FIG. 3 is an enlarged sectional view of main portions of a modification of the first embodiment.

FIGS. 1 to 3 show a single bearing type fishing reel which constitutes a first embodiment of the present invention.

In the single bearing type fishing reel shown in FIG. 1, a support shaft 2 is, by pressure or the like, fixed to and projected from the central portion of a concave-shaped reel main body 1 having one side thereof opened. A swingable member 10 is swingably supported by the support shaft 2. A spool 3 is rotatably fitted to the support shaft 2.

A fishing rod 11 is mounted onto the upper portion of an outer periphery 1a of the reel main body 1 and a notch portion 1b is formed on the opening side of the outer periphery 1a of the reel main body 1.

An engagement plate 12, which is removably mounted to the support shaft 2, is provided in the central portion of the spool 3 and is urged by a spring 13 so as to prevent the spool 3 from being removed from the support shaft 2.

The spool 3 is formed of aluminum in a cylindrical shape by die casting and includes a winding drum portion 3a, around which a fishing line (not shown) is to be wound, and two flange portions 3b, 3c respectively provided on the two sides thereof.

A shaft 14 is fixed to one side portion of the spool 3 and a handle knob 15 is rotatably fitted over the shaft 14.

The flange portion 3b, which is located proximate to the open side of the reel main body 1, is formed at its outer side with a notch portion 3d to which a separate ring 4 is mounted and fixed by means of adhesives.

The ring 4 is formed in a perforated pan shape by machining an aluminum member.

The ring 4 includes an inner peripheral surface 4a which contacts the outer periphery of the flange portion 3b of the spool and is projected toward the notch portion 1b side of the reel main body 1. The ring 4 also includes an outer peripheral surface 4b which is formed to be substantially the same level with the outer periphery 1a of the reel main body 1. The ring 4 is exposed at the outer periphery 4b, near the opening side of the reel main body 1.

The outer peripheral surface 4b of the ring 4 is formed into a smooth surface by machining an aluminum member and is also formed in a shape ideal for an excellent thumbing operation. Further, the ring outer peripheral surface 4b may be formed to provide color and luster.

When a fishing reel of a single bearing type is used, then the fishing rod 11 is held by one hand, the handle knob 15 is grasped by the other hand, and the spool 3 is rotated to thereby wind a fishing line around the winding drum portion 3a of the spool 3.

When the fishing line is drawn out and unwound from the spool 3, then the thumb 16 of the hand holding the fishing rod 11 is put on the outer peripheral surface 4b of the ring 4 to perform a thumbing operation.

If the fishing reel of a single bearing type is constructed in the above-mentioned manner, then the outer peripheral surface 4b of the ring 4 is formed in a smooth surface by machining an aluminum member and in a shape ideal to execute an excellent thumbing action. For this reason, according to the present fishing reel, the thumb can be smoothly touched to the flange outer periphery which in turn makes it possible to perform a thumbing operation for a long time. Thus, the present invention can eliminate the drawbacks found in the conventional fishing reel, that is, the invention can eliminate the problem occurring in a case where the thumb is put on the conventional flange outer periphery formed of aluminum by die casting that lacks minuteness and uniformity.

The main body of the spool 3 can be manufactured with a desired constant strength at a low cost by die casting an aluminum member.

Further, the outer peripheral surface 4b of the ring 4 can be give color and luster, which in turn enhances the commercial value thereof and improves the practicality thereof from the viewpoint of protection.

FIGS. 3 to 5a–5d are respectively enlarged sectional rear views of main portions of various modifications of the above first embodiment of the invention.

In FIG. 3, there is formed a notch portion 3d on the outside of the flange portion 3b of the spool 3. A thread engagement hole 3e is formed through the flange portion 3b. A separate ring 4 is mounted and fixed to the flange portion 3b by a screw 17.

Figure 4:
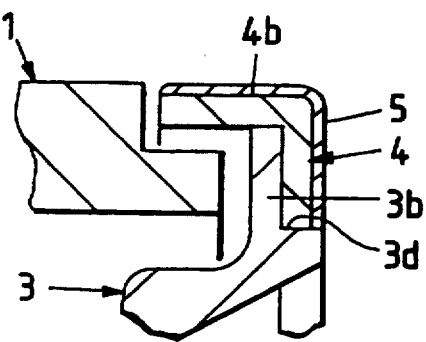
FIG. 4 is an enlarged sectional view of main portions of another modification of the first embodiment.
Figure 5A:
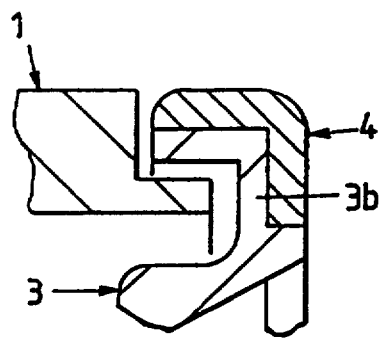
FIGS. 5a-5d are enlarged sectional views of main portions of modifications to the first embodiment.
Figure 5B:
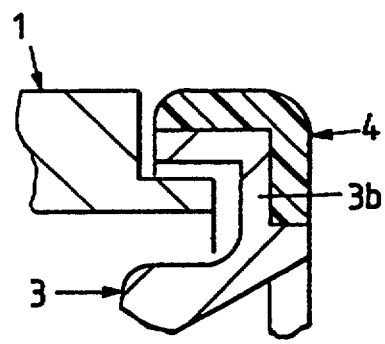
Figure 5C:
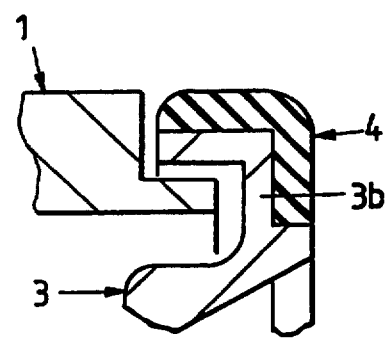
Figure 5D:
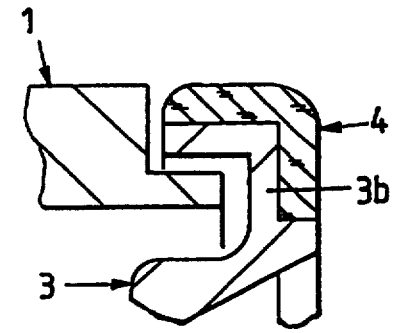

In FIG. 4, there is formed a notch portion 3d on the outside of the flange portion 3b of the spool 3, a separate ring 4 is mounted and fixed to the flange portion 3b by adhesives, and a protection cover 5 is mounted onto the outer peripheral surface 4b of the ring 4.

The protection cover 5 may be a metal plated layer or a resin coated layer.

Also, the ring 4 shown in FIG. 4 may be formed of a synthetic resin.

Referring to FIG. 5a–5d, the ring 4 may be formed of a synthetic resin, rubber, cork or the like and is mounted and fixed to the outside of the flange portion 3b of the spool 3 by adhesives.

In FIG. 5a–5d, if the ring 4 is formed of a material which provides a soft touch, then there can be realized a thumbing operation which gives a soft touch to the thumb. Also, if the ring 4 is formed of a material having a high coefficient of friction, then the braking force thereof is increased.

FIGS. 6 to 9 show a double bearing type fishing reel according to a second embodiment of the invention.

Figure 6:
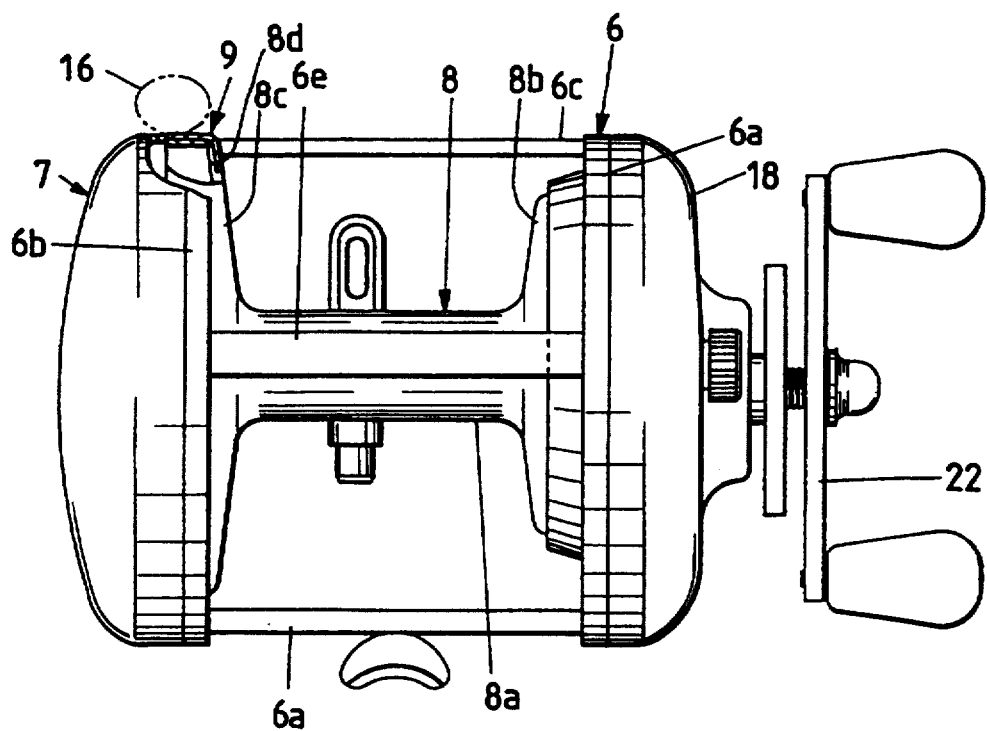
FIG. 6 is a partially sectional view of a second embodiment of a fishing reel of a double bearing type according to the invention.
Figure 7:
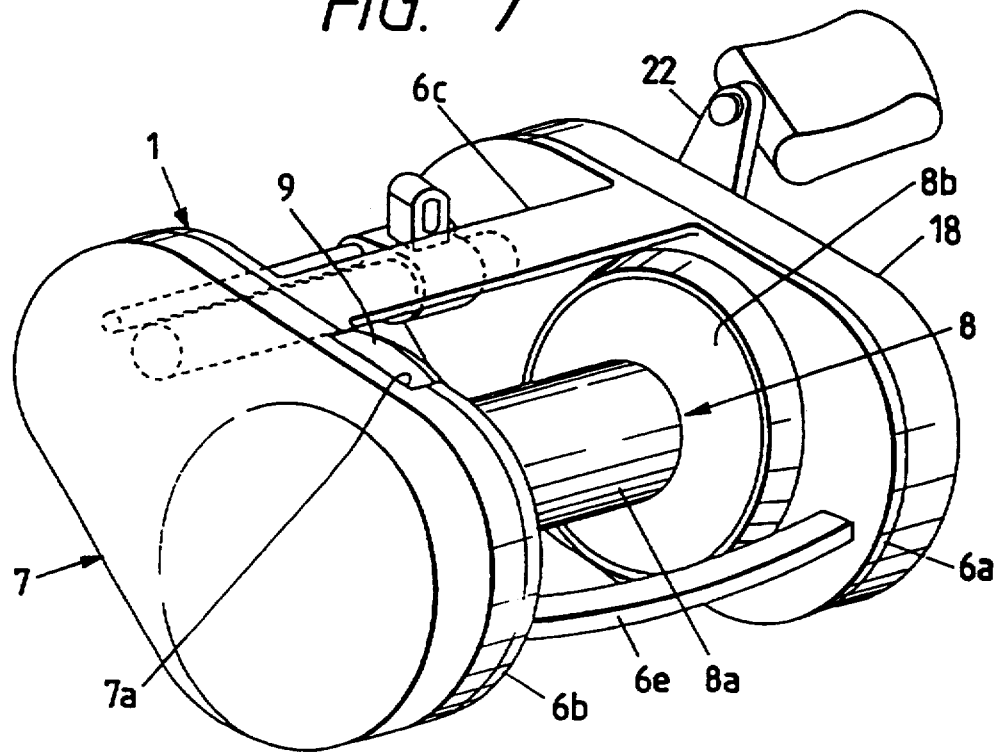
FIG. 7 is a perspective view of the above fishing reel of the double bearing type.
Figure 8:
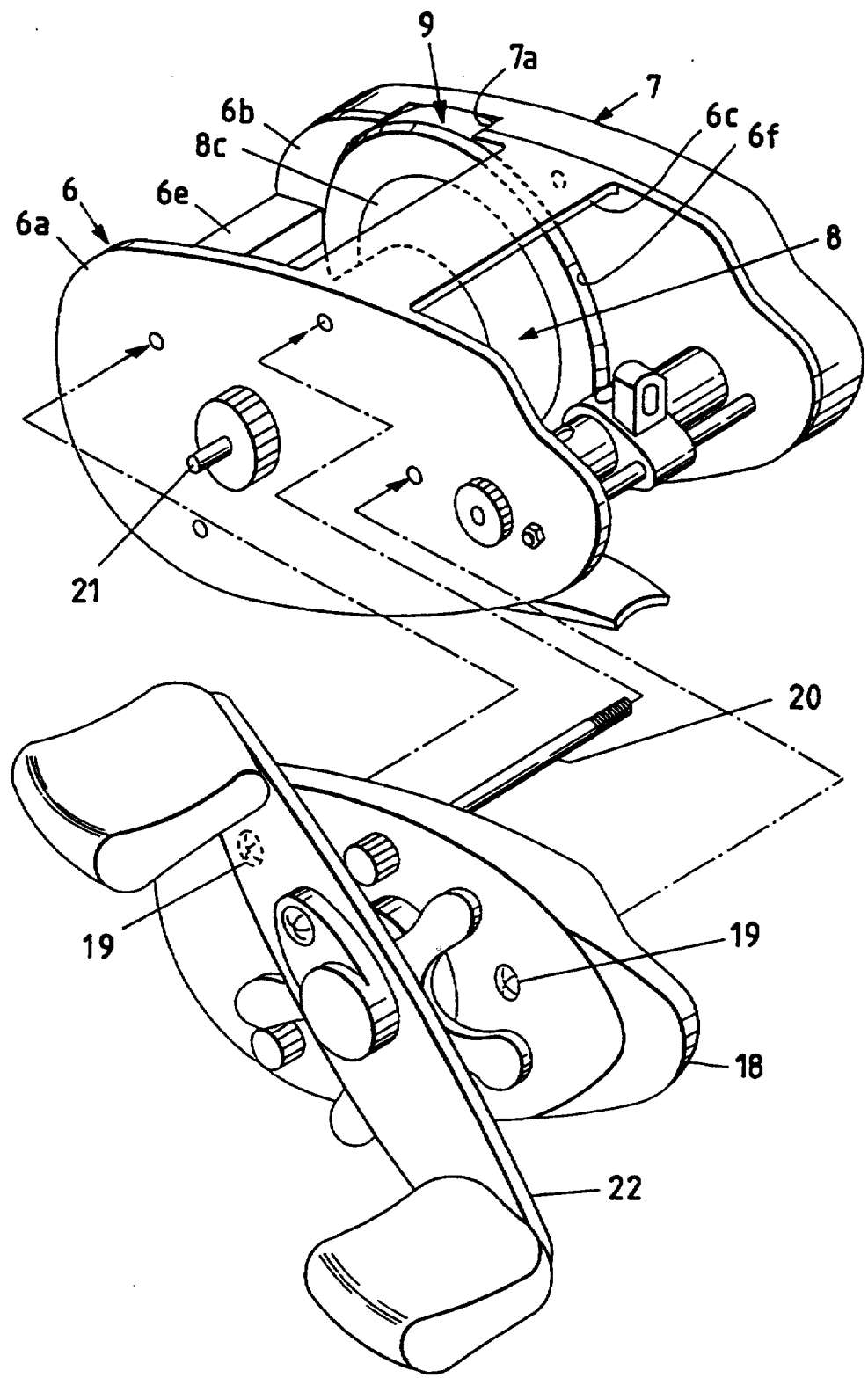
FIG. 8 is an exploded perspective view of the above fishing reel of the double bearing type.

Referring to FIGS. 6 to 8, the fishing reel of a double bearing type includes a reel main body 6 having right and left side frames 6a and 6b. The two right and left side frames 6a an 6b are held integrally and in parallel with each other by means of a plurality of support members 6c, 6d and a finger placing portion 6e.

To the outside of the right side frame 6a is mounted a reel side plate 18 by means of screws 19, as shown in FIG. 8 and, to the outside of the left side frame 6b, there is mounted a reel side plate 7 by means of a bolt 20 which is inserted from the reel side plate 18 side.

A spool shaft 21 is supported by the two right and left side frames 6a, 6b by means of a bearing (not shown) and spool 8 is fixed to the spool shaft 21 in such a manner that it is rotatable between the right and left side frames 6a and 6b. In operation, the spool 8 can be rotated by use of a handle 22.

The spool 8 is formed of aluminum in a drum shape by die casting and includes a winding drum portion 8a for winding a fishing line (not shown) therearound and two flange portions 8b, 8c respectively disposed on the two sides thereof, while one flange 8c is greater in diameter than the other flange 8b.

Figure 9:
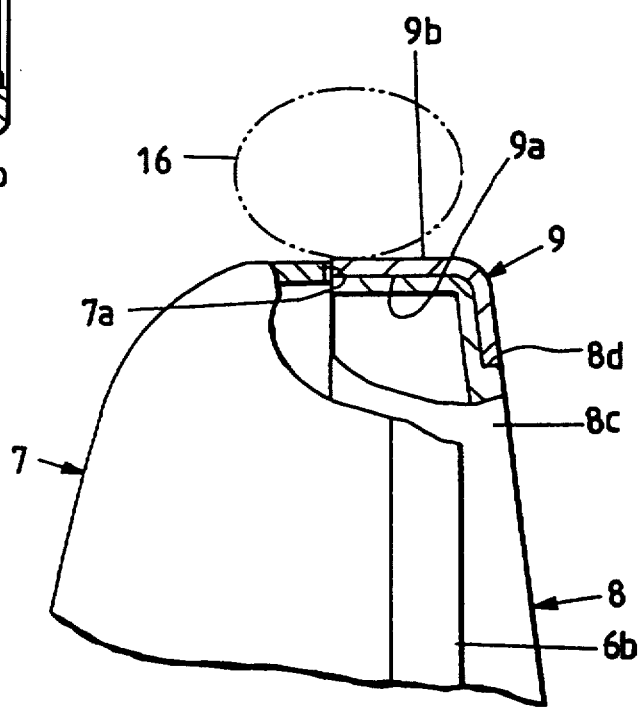
FIG. 9 is an enlarged sectional view of main portions of the above fishing reel of the double bearing type.

In a portion of the flange portion 8c of the spool 8 near the winding drum portion 8a, as shown in FIGS. 6 and 9, there is formed a notched portion 8d to which a separate ring 9 is mounted and fixed by adhesives.

In the left frame 6b, there is formed a through hole 6f into which the ring 9 can be inserted with the outer periphery thereof having a slight clearance therebetween. The through hole 6f is cut away in the upper portion thereof and thus part of the outer periphery of the ring 9 is exposed in such a manner that it projects out from the cutaway portion of the through hole 6f.

Further, in the upper portion of the reel side plate 7, there is formed a recessed portion 7a which extends in the direction of the spool shaft 21 and part of the outer periphery of the ring 9 is exposed in such a manner that it projects out from the recessed portion 7a.

The ring 9 is formed in a pan shape by machining an aluminum member.

The ring 9 includes an inner peripheral surface 9a which is put on the outer periphery of the flange portion 8c and also which is fitted into the notch portion 8d of the spool 8 and is mounted and fixed thereto.

The ring 9 also includes an outer peripheral surface 9b which is formed in a smooth surface by machining an aluminum member and also which is formed in a shape ideal to perform a good thumbing operation. The outer peripheral surface 9b can be given color and luster.

When the fishing reel of a double bearing type is used, a fishing rod (not shown) is held by one hand, the handle 22 is grasped by the other hand, and the spool 8 is rotated to wind fishing line around the winding drum portion 8a of the spool 8.

When the fishing line is drawn out and unwound from the spool 8, the thumb 16 of the hand holding the reel main body 6 is placed on the outer peripheral surface 9b of the ring 9 to execute a thumbing operation.

The ring 9 illustrated in the second embodiment of the invention may be formed similarly as in the first embodiment, that is, as shown in FIGS. 2 to 5a–5d.

In the second embodiment, the two right and left side frames 6a and 6b of the reel main body 6 are formed integrally and in a parallel with each other by means of a plurality of support members 6c, 6d and a finger placing portion 6e. However, the two right and left side frames 6a and 6b may be formed separately from each other and may be held in parallel with each other.

In this case, since the left side frame 6b of the reel main body 6 includes the through hole 6f into which the ring 9 can be inserted with the outer periphery thereof having a slight clearance therebetween and also which has an upper portion that is cut away, the left side frame 6b of the reel main body 6 can be properly reinforced.

As has been described heretofore, according to the invention, due to the fact that a separate ring is mounted and fixed to the outer periphery of the flange portion of a spool, the optimum shape and material of the spool flange outer periphery can be selected and the best color and luster can be given to the spool flange outer periphery. Owing to this, the invention can provides a fishing reel which enjoys several practical effects, that is, which provides an excellent thumbing action, improves the practicality thereof from the viewpoint of protection, increases the commercial value thereof, allows the thumb to touch thereto smoothly and softly, and provides a thumbing operation for a long time.

What is claimed is:

1. A fishing reel comprising:
   a spool shaft defining an axis of rotation;
   said spool shaft is mounted on a concave reel main body having a first outer peripheral surface, said reel main body further having a rim defining a circular aperture centered around said axis and a notch projection extending axially outward from said rim;
   a spool rotatably supported on said spool shaft, said spool includes a radially extending flange portion substantially filling said aperture; and,
   a separate ring having a second outer peripheral surface positioned on said flange portion, said notch projection is radially interposed between said flange portion and said separate ring, as well as said first and second outer peripheral surfaces are substantially flush with respect to one another, wherein said separate ring is formed into L-shape in cross-section.

2. The fishing reel according to claim 1, wherein said flange portion includes a notched portion in which said separate ring is fixed on said flange portion.

3. The fishing reel according to claim 1, wherein said separate ring has a relatively high friction coefficient with respect to a user's thumb.

4. The fishing reel according to claim 1, wherein said separate ring is formed of aluminum.

5. The fishing reel according to claim 1, wherein said separate ring is formed of synthetic resin.

6. The fishing reel according to claim 1, wherein said separate ring is formed of rubber.

7. The fishing reel according to claim 1, wherein said separate ring is formed of cork.

8. A fishing reel comprising:
   a spool shaft defining an axis of rotation;
   said spool shaft is mounted on a concave reel main body having a first outer peripheral surface, said reel main body further having a rim defining a circular aperture centered around said axis The application has been amended as follows: and a notch projection extending axially outward from said rim;
   a spool rotatably supported on said spool shaft, said spool includes a radially extending flange portion substantially filling said aperture; and,
   a separate ring having a second outer peripheral surface positioned on said flange portion and a protective cover having a third outer peripheral surface, said protective cover is mounted onto said second outer peripheral surface whereupon said first and third outer peripheral surfaces are substantially flush with respect to one another, said notch projection is radially interposed between said flange portion and said separate ring, wherein in said separate ring is formed into an L-shape in cross-section.

9. A fishing reel comprising:
   a reel main body including a first side frame and a second side frame, said first side frame having a first outer peripheral surface;
   a spool interposed between and rotatably supported by said first and said second side frames, said spool including a first radially extending flange portion proximate to said first side frame and a second radially extending flange portion proximate to said second side frame;
   said first radially extending flange portion is fixed with respect to a separate ring having a second outer peripheral surface; and,
   said first outer peripheral surface includes a recess and said second outer peripheral surface projects through said recess radially outward beyond said first outer peripheral surface.

10. The fishing reel according to claim 9, wherein said first radially extending flange has a greater diameter than said second radially extending flange.

11. A fishing reel comprising:
    a spool shaft defining an axis of rotation;
    said spool shaft is mounted on a reel main body having at least one axially extending projection, said at least one axially extending projection having a radially outer peripheral surface and a notch projection further extending axially from said at least one axially extending projection;
    a spool rotatably supported on said spool shaft, said spool includes a flange portion radially extending so as to be substantially adjacent to a radially inner peripheral surface of said at least one axially extending projection; and,
    a separate ring having an outer circumferential surface positioned on said flange portion, said notch projection is radially interposed between said flange portion and said separate ring, as well as said radially outer peripheral surface and said outer circumferential surface are substantially flush with respect to one another.

* * * * *